United States Patent
Shimizu

(10) Patent No.: US 7,298,247 B2
(45) Date of Patent: Nov. 20, 2007

(54) VEHICLE PERIPHERY MONITORING SYSTEM

(75) Inventor: Hiroaki Shimizu, Handa (JP)

(73) Assignee: DENSO CORPORATION, Kariya (JP)

( * ) Notice: Subject to any disclaimer, the term of this patent is extended or adjusted under 35 U.S.C. 154(b) by 119 days.

(21) Appl. No.: 11/096,263

(22) Filed: Apr. 1, 2005

(65) Prior Publication Data

US 2005/0231341 A1  Oct. 20, 2005

(30) Foreign Application Priority Data

Apr. 2, 2004 (JP) .............................. 2004-109979

(51) Int. Cl.
*B60Q 1/00* (2006.01)
(52) U.S. Cl. .................. 340/435; 340/932.2; 348/148; 382/103
(58) Field of Classification Search ...................... None
See application file for complete search history.

(56) References Cited

U.S. PATENT DOCUMENTS 5,670,935 A * 9/1997 Schofield et al. ........... 340/461
6,172,601 B1 * 1/2001 Wada et al. ................. 340/436
6,583,403 B1 * 6/2003 Koike et al. ................. 250/221
2002/0110262 A1 * 8/2002 Iida et al. .................... 382/104

FOREIGN PATENT DOCUMENTS

| JP | 9-287915 | 11/1997 |
| JP | 2002-59798 | 2/2002 |

* cited by examiner

*Primary Examiner*—Benjamin C. Lee
(74) *Attorney, Agent, or Firm*—Posz Law Group, PLC

(57) ABSTRACT

If the detected distance from a vehicle to a detected obstacle is equal to or greater than a preset distance, then a vehicle periphery monitoring system performs an image processing process on a captured image of the periphery of the vehicle to acquire the height of the vehicle. If the acquired height of the obstacle is less than a preset height, then the obstacle is displayed as a safe obstacle. If the acquired height of the obstacle is equal to or greater than the preset height, then the obstacle is displayed as a dangerous obstacle. The vehicle periphery monitoring system is able to indicate to the vehicle driver whether the detected obstacle is dangerous or safe. The vehicle periphery monitoring system is not required to perform the image processing process on the entire area of the captured image, and does not require a CPU having a high processing capability.

13 Claims, 5 Drawing Sheets

CAPTURED IMAGE

BIRD'S-EYE IMAGE

VEHICLE PERIPHERY MONITORING SYSTEM

CROSS REFERENCE TO RELATED DOCUMENT

The present application claims the benefit of Japanese Patent Application No. 2004-109979 filed on Apr. 2, 2004, the disclosure of which is incorporated herein by reference.

BACKGROUND OF THE INVENTION

1. Field of the Invention

The present invention relates to a vehicle periphery monitoring system, and more particularly to a vehicle periphery monitoring system having an obstacle detecting unit for detecting the presence of an obstacle in the periphery of a vehicle and a controller for controlling an indicating unit to indicate the presence of an obstacle when the presence of such an obstacle is detected by the obstacle detecting unit.

2. Description of the Related Art

Heretofore, there have been known various systems for detecting an obstacle that is present in the periphery of a vehicle and indicating the detected obstacle to the driver of the vehicle. One known system employs sonic waves to detect an obstacle as disclosed in Japanese laid-open patent publication No. 2002-59798, and another conventional system detects an obstacle based on a contrast difference in a captured image as disclosed in Japanese laid-open patent publication No. H09-287915.

The former known system, which employs sonic waves to detect an obstacle, needs to keep a certain detection distance in which to detect obstacles in order to provide a certain detection range. However, since sonic waves that are radiated into the detection range are vertically spread, if the detection distance is equal to or greater than a predetermined distance, the system tends to also detect undangerous obstacles on the ground, such as pebbles and wheel blocks, and indicate those detected undangerous obstacles to the driver of the vehicle. Therefore, the system is liable to keep the driver excessively on full alert while in operation, i.e., to fail to give the driver an adequate sense of safety. The latter known system, which detects an obstacle based on a contrast difference in a captured image, requires a CPU having a high processing capability due to the need for processing the entire area of the captured image.

SUMMARY OF THE INVENTION

It is therefore an object of the present invention to provide a vehicle periphery monitoring system for giving the driver of a vehicle an adequate sense of safety by indicating whether a detected obstacle is a dangerous obstacle or a safe obstacle, and which can be realized without the need for a CPU having a high processing capability.

According to the present invention, an obstacle detecting unit detects the presence of an obstacle in a periphery of a vehicle. If the detected distance from the vehicle to the obstacle detected by the obstacle detecting unit is equal to or greater than a preset distance, e.g., a maximum distance in which all detected obstacles need to be indicated as dangerous obstacles, then a control unit performs an image processing process on a viewpoint-changed image which is produced by changing the viewpoint of the image captured by the imaging unit, for thereby acquiring the height of the detected obstacle. The control unit controls an indicating unit to either indicate the detected obstacle as a safe obstacle or inhibit the detected obstacle from being indicated if the acquired height of the detected obstacle is less than a preset height, e.g., the height of the bumper of the vehicle, and controls the indicating unit to indicate the detected obstacle as a dangerous obstacle if the acquired height of the detected obstacle is equal to or greater than the preset height.

For example, if a person is detected at a distance greater than the preset distance from the vehicle, then the control unit indicates the detected person as a dangerous obstacle. If a pebble or a wheel block is detected at a distance greater than the preset distance from the vehicle, then the control unit either indicates the detected pebble or wheel block as a safe obstacle or inhibits the detected pebble or wheel block from being indicated. Therefore, the vehicle periphery monitoring system is able to indicate to the driver of the vehicle whether the detected obstacle is a dangerous obstacle or a safe obstacle. The driver is not kept excessively on full alert, i.e., is given an adequate sense of safety while the vehicle periphery monitoring system is operation. Since the vehicle periphery monitoring system acquires the height of the obstacle by performing the image processing process on the viewpoint-changed image, the vehicle periphery monitoring system is not required to perform the image processing process on the entire area of the captured image, and hence does not require a CPU having a high processing capability.

The indicating unit may comprise a display unit for displaying an image captured by an imaging unit, and the control unit may control the display unit to display the detected obstacle as a safe obstacle overlappingly in the captured image displayed by the display unit if the acquired height of the detected obstacle is less than the preset height. Therefore, the obstacle detected as the safe obstacle is visually indicated to the driver.

Alternatively, the indicating unit may comprise a display unit for displaying a bird's-eye image converted from the image captured by the imaging unit, and the control unit may control the display unit to display the detected obstacle as a safe obstacle overlappingly in the bird's-eye image displayed by the display unit if the acquired height of the detected obstacle is less than the preset height. Inasmuch as the obstacle is displayed overlappingly in the bird's-eye image, the driver is able to have an accurate sense of distance with respect to the obstacle.

The control unit may control the display unit to display the detected obstacle in combination with distance indicator lines indicative of respective distances from the vehicle and distance indicator markings associated with the distance indicator lines, overlapping in the bird's-eye image if the acquired height of the detected obstacle is less than the preset height. Consequently, the driver can visually perceive the distance from the vehicle to the obstacle with the aid of the distance indicator lines and the distance indicator markings.

The control unit may perform the image processing process on a portion of the viewpoint-changed image which is produced by changing the viewpoint of the image captured by the imaging unit, for thereby acquiring the height of the detected obstacle. As the image processing process is performed on a portion or limited area of the viewpoint-changed image, but not on the entire viewpoint-changed image, the processing load imposed on the vehicle periphery monitoring system for acquiring the height of the obstacle is relatively small.

The above and other objects, features, and advantages of the present invention will become apparent from the following description when taken in conjunction with the accompanying drawings which illustrate a preferred embodiment of the present invention by way of example.

DESCRIPTION OF THE PREFERRED EMBODIMENT

Figure 1:
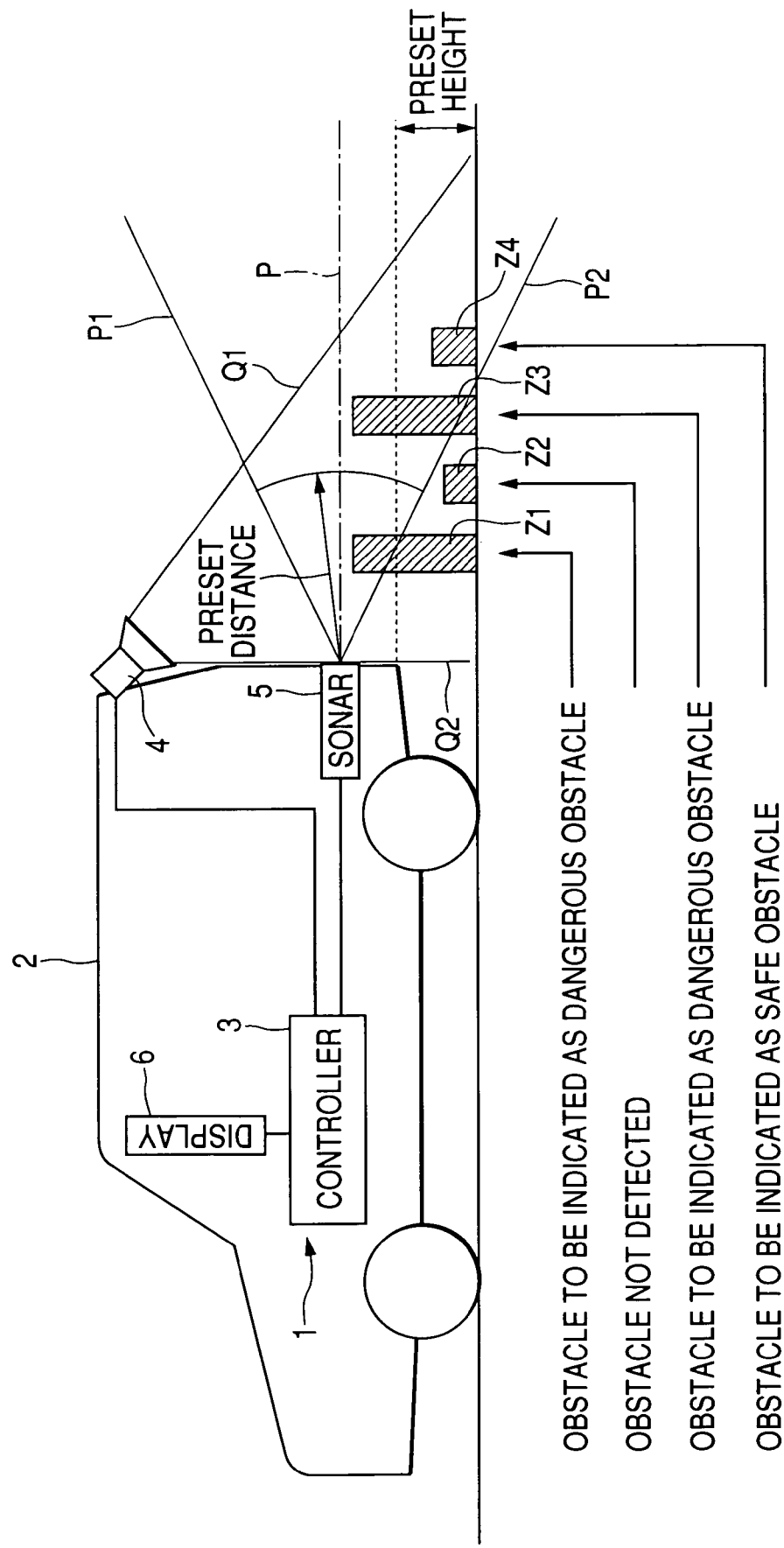
FIG. 1 is a schematic side elevational view showing a vehicle periphery monitoring system according to an embodiment of the present invention.

FIG. 1 schematically shows in side elevation a vehicle periphery monitoring system 1 according to an embodiment of the present invention.

As shown in FIG. 1, the vehicle periphery monitoring system 1 is mounted on a vehicle 2 such as an automobile and has a controller 3, a vehicle-mounted camera 4, a sonic sonar 5, and a display unit 6. The controller 3 serves as a control unit, the vehicle-mounted camera 4 as an imaging unit, the sonic sonar 5 as an obstacle detecting unit, and the display unit 6 as an indicating unit which may server as a display unit.

The controller 3 comprises a CPU, a RAM, a ROM, and I/O buses, and executes a control program to control the overall operation of the vehicle periphery monitoring system 1. The vehicle-mounted camera 4 is installed on an upper portion of the rear end of the vehicle 2. The vehicle-mounted camera 4 captures an, image of an area behind the vehicle 2, and outputs the captured image to the controller 3. The sonic sonar 5 is installed on a lower portion of the rear end of the vehicle 2. The sonic sonar 5 radiates sonic waves rearwardly of the vehicle 2 into a vertical range having a central horizontal axis P extending centrally therein. The sonic sonar 5 detects whether there is an obstacle in the vertical range or not based on whether there is an echo received from the vertical range or not, and outputs a detected signal to the controller 3. If the sonic sonar 5 detects an obstacle, then the sonic sonar 5 also calculates a detected distance depending on the period of time that is spent after it has radiated the sonic waves until it receives the echo, and outputs the detected distance to the controller 3. The display unit 6 is disposed in such a position in the passenger compartment of the vehicle 2 that the display unit 6 can easily be visually perceived by the driver of the vehicle 2. The display unit 6 has a display function to display an image and a command accepting function to accept commands input by the driver through a touch panel.

The vertical range into which the sonic sonar 5 radiates sonic waves is defined between an upper edge P1 and a lower edge P2. The area imaged by the vehicle-mounted camera 4 is also spread vertically and defined between edges Q1, Q2. The vertical range into which the sonic sonar 5 radiates sonic waves and the area imaged by the vehicle-mounted camera 4 overlap each other, so that the vehicle-mounted camera 4 can capture an image of the range for the sonic sonar 5 to detect an obstacle or obstacles therein.

The vehicle periphery monitoring system 1 may be part of a car navigation system incorporated in the vehicle 2, and the display unit 6 may be the display monitor of the car navigation system.

Figure 2:
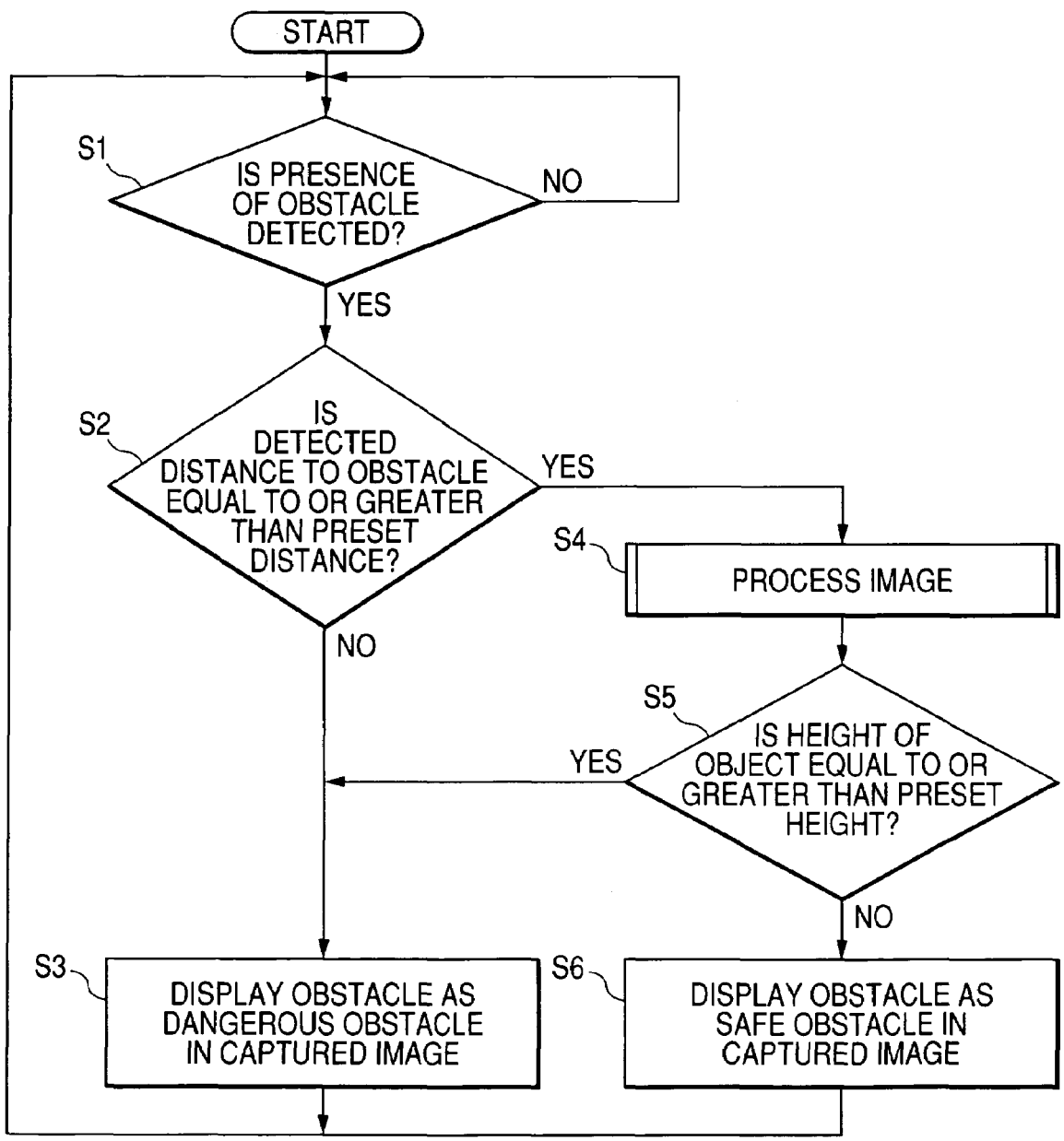
FIG. 2 is a flowchart of an operation sequence of the vehicle periphery monitoring system.
Figure 3:
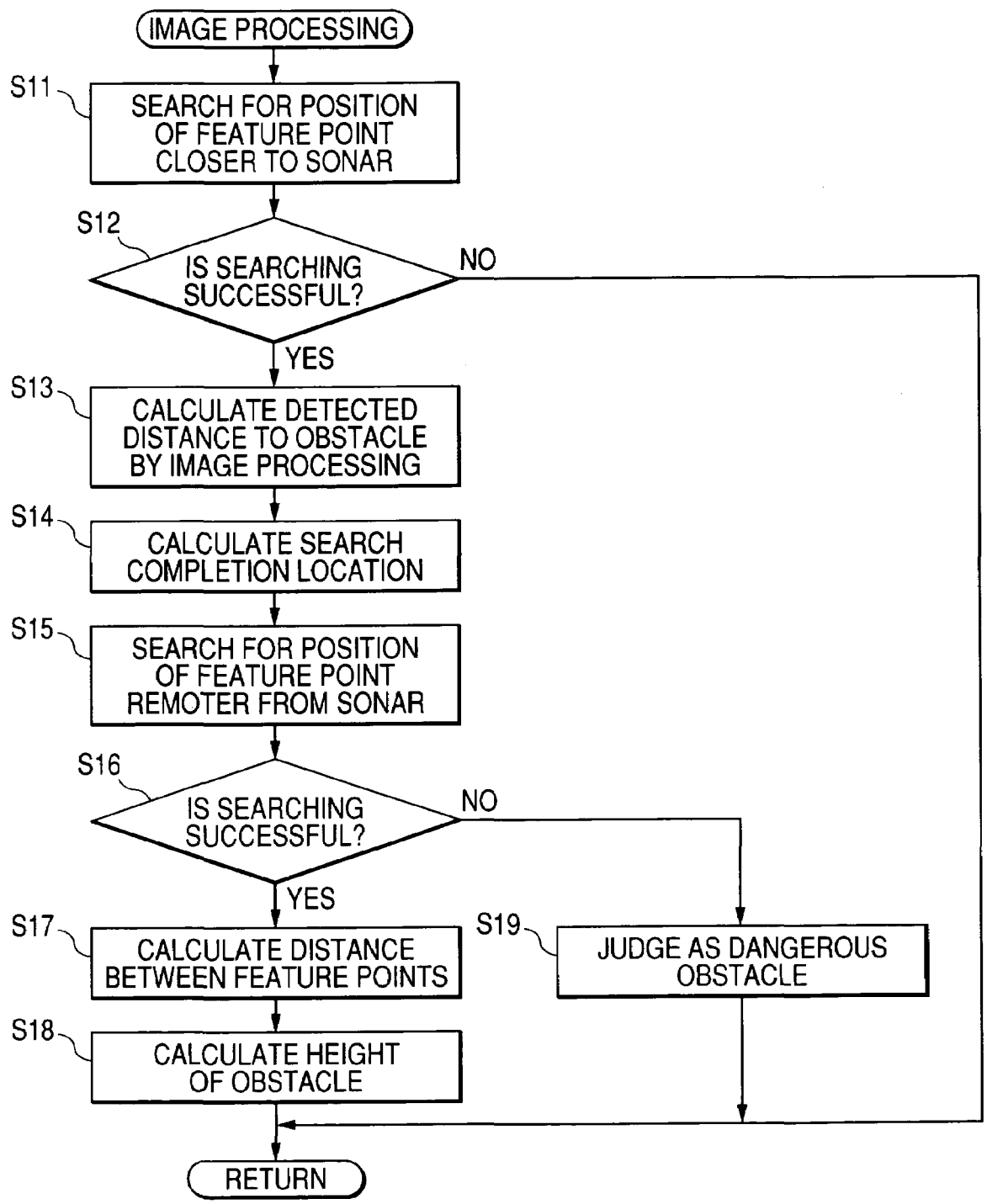
FIG. 3 is a flowchart of a subroutine of the operation sequence shown in FIG. 3.

Operation of the vehicle periphery monitoring system 1 will be described below with reference to FIGS. 2 through 5A, 5B. FIGS. 2 and 3 are flowcharts of an operation sequence of the vehicle periphery monitoring system 1 and a subroutine of the operation sequence, respectively.

When the vehicle periphery monitoring system 1 is activated, the controller 3 monitors whether the sonic sonar 5 has detected the presence of an obstacle or not in step S1. If the sonic sonar 5 has detected the presence of an obstacle ("YES" in step S1), then the controller 3 determines whether or not the detected distance up to the obstacle is equal to or greater than a preset distance in step S2. The preset distance is defined as a maximum distance in which all detected obstacles need to be indicated as dangerous obstacles, and is set to 50 cm., for example.

If the sonic sonar 5 has not detected the presence of an obstacle ("NO" in step S1), then the controller 3 repeatedly monitors whether the sonic sonar 5 has detected the presence of an obstacle or not in step S1. As shown in FIG. 1, an obstacle Z2 positioned outside of the vertical range of the sonar 5 is not detected.

If the detected distance up to the obstacle is smaller than the preset distance ("NO" in step S2), then the controller 3 controls the display unit 6 to display the detected obstacle as a dangerous obstacle overlappingly in an image that is captured by the vehicle-mounted camera 4 in step S3. Therefore, when an obstacle is detected and the detected distance up to the detected obstacle is less than the preset distance, since the detected obstacle is displayed as a dangerous obstacle overlapping in the captured image by the display unit 6, the driver of the vehicle 2 is able to confirm that the dangerous object is present in an area within the preset distance from the vehicle 2. Specifically, in FIG. 1, the driver is able to confirm the presence of an obstacle Z1 within the preset distance.

If the detected distance up to the obstacle is equal to or greater than the preset distance ("YES" in step S2), then the controller 3 performs an image processing process on a viewpoint-changed image that is generated by changing the viewpoint of the image captured by the vehicle-mounted camera 4, for thereby calculating the height of the obstacle in step S4. The image processing process in step S4 will be described in detail below with reference to FIGS. 3 and 4.

Figure 4:
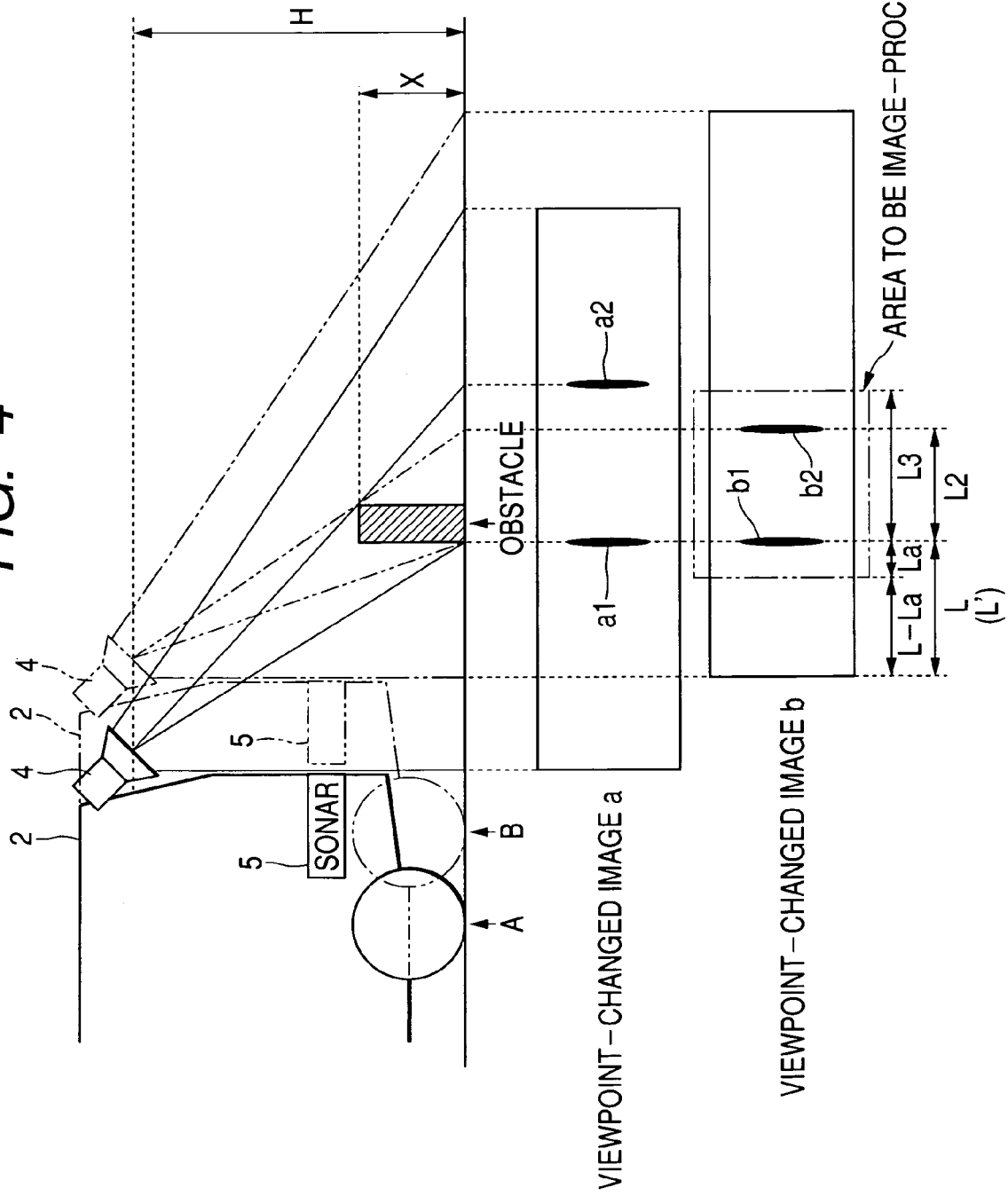
FIG. 4 is a schematic side elevational view showing an image processing process carried out by the vehicle periphery monitoring system.

When the image processing process is started, the controller 3 generates two viewpoint-changed images by changing the viewpoint of two images that are captured at different times by the vehicle-mounted camera 4 to an overhead viewpoint. Specifically, as shown in FIG. 4, the controller 3 generates a viewpoint-changed image "a" by changing the viewpoint of an image that is captured by the vehicle-mounted camera 4 when the vehicle 2 is positioned at a location "A". After the vehicle 2 moves from the location "A" to a location "B", the controller 3 generates a viewpoint-changed image "b" by changing the viewpoint of an image that is captured by the vehicle-mounted camera 4 when the vehicle 2 is positioned at the location "B". The viewpoint-changed image A contains two feature points "a1", "a2" corresponding to two edges, i.e., a lower left edge and an upper right edge, of the obstacle, and the viewpoint-changed image B contains two feature points "b1", "b2" corresponding to the two edges of the obstacle.

The controller 3 performs the image processing process on the viewpoint-changed image B from a location "L−La", where L represents the detected distance up to the obstacle detected by the sonic sonar 5 and La a detection error, in a direction away from the vehicle 2, for thereby searching for the position of the feature point "b1" closer to the sonic sonar 5 in step S11. If the searching is successful ("YES" in step S12), then the controller 3 calculates the distance up to the located position as a detected distance "L'" according to the image processing process in step S13.

Then, the controller 3 calculates a searching-completion location "L3" according to the equation (1) shown below where "H" represents the height of the vehicle-mounted camera 4 and "X'" the tentative height of the obstacle in step S14. Stated otherwise, the controller 3 limits the imaged area to be processed by the image processing process. The tentative height "X'" of the obstacle is an allowable maximum height that does not obstruct the travel of the vehicle 2, and may be the height of the bumper of the vehicle 2, for example.

$$L3=(X'/(H-X'))\times L'+La \quad (1)$$

Thereafter, the controller 3 performs the image processing process on the viewpoint-changed image B from the feature point "b1" closer to the sonic sonar 5, which has previously been identified, in the away from the vehicle 2 toward the location "L3", for thereby searching for the position of the feature point "b2" remoter from the sonic sonar 5 in step S15. If the searching is successful ("YES" in step S16), then the controller 3 calculates the distance "L2" between the position of the feature point "b1" closer to the sonic sonar 5 and the position of the feature point "b2" remoter from the sonic sonar 5 in step S17. The controller 3 calculates the height "X" of the obstacle according to the following equation (2) in step S18:

$$X=(L2/(L'+L2))\times H \quad (2)$$

If the controller 3 fails to search for the position of the feature point "b2" remoter from the sonic sonar 5 ("NO" in step S16), then the controller 3 judges the detected obstacle as a dangerous obstacle in step S19.

After the height "X" of the obstacle is calculated, control goes back to the main routine shown in FIG. 2. The controller 3 determines whether or not the calculated height "X" is equal to or greater than a preset height in step S5. The preset height is the same as the tentative height "X'" of the obstacle, i.e., an allowable maximum height that does not obstruct the travel of the vehicle 2, and may be the height of the bumper of the vehicle 2, for example.

If the height "X" of the obstacle is equal to or greater than the preset height ("YES" in step S5), then the controller 3 controls the display unit 6 to display the detected obstacle as a dangerous obstacle overlappingly in the captured image in step S3. Therefore, when an obstacle is detected and the detected distance up to the detected obstacle is equal to or greater than the preset distance and the height "X" of the detected obstacle is equal to or greater than the preset height, since the detected obstacle is displayed as a dangerous obstacle overlapping in the captured image by the display unit 6, the driver of the vehicle 2 is able to confirm that the dangerous object is present in the area within the preset distance from the vehicle 2. Specifically, in FIG. 1, the driver is able to confirm the presence of an obstacle Z3 within the preset distance.

Figure 5A:
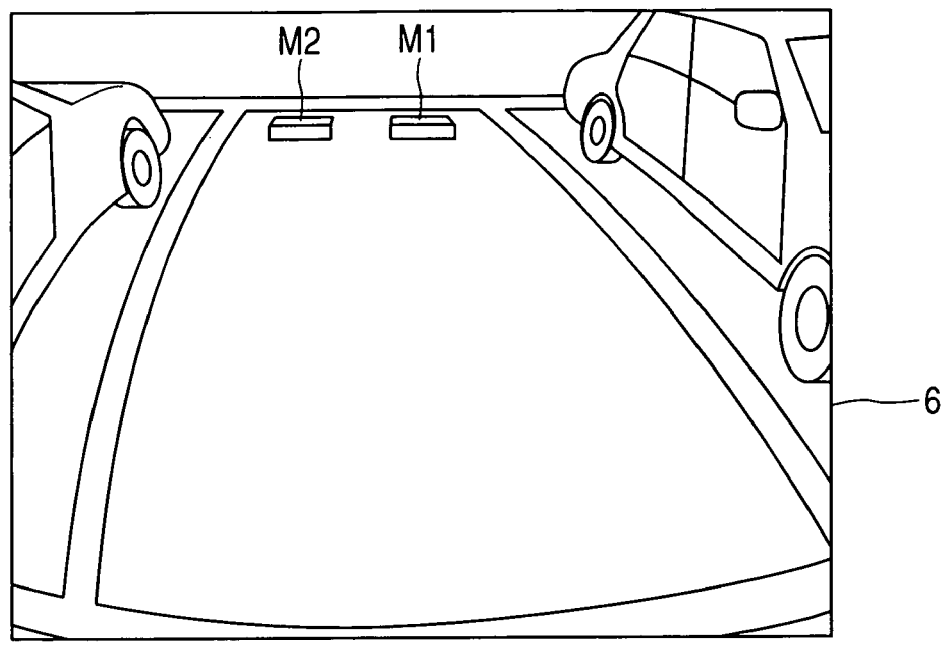
FIG. 5A is a view showing an image captured by a vehicle-mounted camera of the vehicle periphery monitoring system.
Figure 5B:
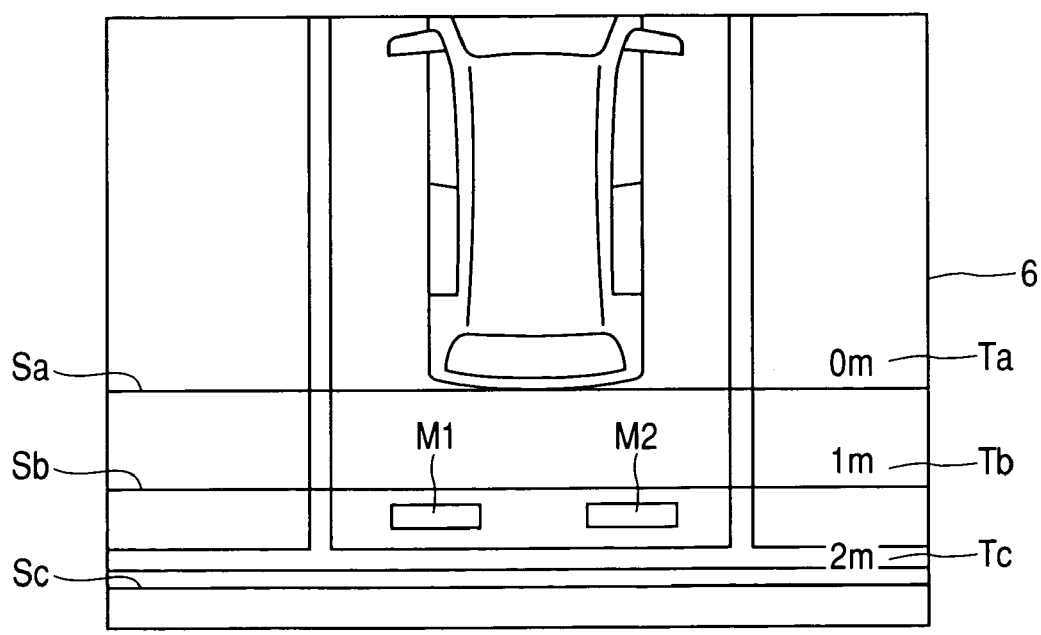
FIG. 5B is a view showing a bird's-eye image which is generated by changing the viewpoint of the captured image.

If the height "X" of the obstacle is smaller than the preset height ("NO" in step S5), then the controller 3 controls the display unit 6 to display the detected obstacle as a safe obstacle overlappingly in the captured image in step S6. Therefore, when an obstacle is detected and the detected distance up to the detected obstacle is equal to or greater than the preset distance and the height "X" of the detected obstacle is smaller than the preset height, since the detected obstacle is displayed as a safe obstacle overlapping in the captured image by the display unit 6, the driver of the vehicle 2 is able to confirm that the safe obstacle is present in the area within the preset distance from the vehicle 2. Specifically, in FIG. 1, the driver is able to confirm the presence of an obstacle Z4 within the preset distance. In the present embodiment, wheel blocks "M1", "M2" shown in FIG. 5B are detected and displayed as safe obstacles by way of example. Other safe objects such as pebbles and curbs are also similarly detected and displayed.

In the above embodiment, obstacles are displayed overlappingly in the captured image. However, obstacles may be displayed overlappingly in a bird's-eye image that is converted from a captured image, as shown in FIG. 5B. Specifically, as shown in FIG. 5B, distance indicator lines "Sa", "Sb", "Sc" indicative of respective distances from the rear end of the vehicle 2 and distance indicator markings "Ta", "Tb", "Tc" representing metric indications, for example, which are associated with the distance indicator lines "Sa", "Sb", "Sc" may also be displayed overlappingly in the bird's-eye image. In the above embodiment, if the height "X" of the obstacle is smaller than the preset height, the detected obstacle is displayed as a safe obstacle overlappingly in the captured image. Alternatively, however, the detected obstacle as a safe obstacle may not be displayed, i.e., may be inhibited from being displayed, in the captured image.

According to the present embodiment, as described above, if the detected distance up to a detected obstacle is equal to or greater than the preset distance, then the vehicle periphery monitoring system 1 performs the image processing process on the viewpoint-changed image to acquire the height "X" of the obstacle, and displays the detected obstacle as a safe obstacle if the acquired height "X" is less than the preset height, and displays the detected obstacle as a dangerous obstacle if the acquired height "X" is equal to or greater than the preset height. Therefore, the vehicle periphery monitoring system 1 is able to indicate to the driver of the vehicle 2 whether the detected obstacle is a dangerous obstacle or a safe obstacle. The driver is not kept excessively on full alert, i.e., is given an adequate sense of safety while the vehicle periphery monitoring system 1 is operation. Since the vehicle periphery monitoring system 1 acquires the height "X" of the obstacle by performing the image processing process on the viewpoint-changed image, the vehicle periphery monitoring system 1 is not required to perform the image processing process on the entire area of the captured image, and hence does not require a CPU having a high processing capability.

Inasmuch as an obstacle detected as a safe obstacle is displayed overlappingly in the captured image or the bird's-eye image, the obstacle detected as the safe obstacle is visually indicated to the driver. The distance indicator lines "Sa", "Sb", "Sc" and the distance indicator markings "Ta", "Tb", "Tc" associated with the respective distance indicator lines "Sa", "Sb", "Sc", which are displayed overlappingly in the bird's-eye image, also give the driver a visual indication of the distance up to the object from the rear end of the vehicle 2.

The vehicle periphery monitoring system 1 may indicate the presence of an obstacle to the driver audibly through sounds, rather than visually through a displayed image, or may indicate the presence of an obstacle to the driver both visually through a displayed image and audibly through sounds. If the vehicle periphery monitoring system 1 indicates the presence of an obstacle to the driver audibly through sounds, then the vehicle periphery monitoring system 1 use different sound levels, different frequencies, or different sound patterns to indicate whether a detected obstacle is a dangerous obstacle or a safe obstacle.

The vehicle periphery monitoring system 1 may employ an ultrasonic sonar or a radar sonic sonar, rather than the sonic sonar described above.

Although a certain preferred embodiment of the present invention has been shown and described in detail, it should be understood that various changes and modifications may be made therein without departing from the scope of the appended claims.

What is claimed is:

1. A vehicle periphery monitoring system comprising:
   an obstacle detecting unit for detecting the presence of an obstacle, wherein the detecting unit includes means for measuring a distance from the vehicle to the obstacle;
   an indicating unit for indicating the presence of the obstacle;
   a control unit for controlling said indicating unit to indicate the presence of the obstacle when the presence of the obstacle is detected by said obstacle detecting unit; and
   an imaging unit for capturing an image of a periphery of the vehicle;
   wherein if the detected distance from the vehicle to the obstacle detected in said obstacle detecting unit is equal to or greater than a preset distance,
   said control unit is configured to generate a first viewpoint-changed image by changing a first viewpoint of a first image that is captured by said imaging unit at a moment just after said image unit captured said obstacle, and to generate a second viewpoint-changed image by changing second viewpoint of a second image that is captured by said imaging unit at a predetermined time after said image unit has captured said obstacle,
   said control unit is configured to perform an image processing process only on a part of said second viewpoint-changed image when a second feature point of said obstacle contained in said second viewpoint-changed image that corresponds to a first feature point in said first viewpoint-changed image is searched, thereby acquiring the height of the detected obstacle,
   said control unit is configured to control said indicating unit to either indicate the detected obstacle as a safe obstacle or inhibit the detected obstacle from being indicated if the acquired height of the detected obstacle is less than a preset height, and
   said control unit is configured to control said indicating unit to indicate the detected obstacle as a dangerous obstacle if the acquired height of the detected obstacle is equal to or greater than said preset height.

2. A vehicle periphery monitoring system according to claim 1, wherein said indicating unit comprises a display unit for displaying the image captured by said imaging unit, and said control unit controls said display unit to display the detected obstacle as a safe obstacle overlappingly in the captured image displayed by said display unit if the acquired height of the detected obstacle is less than said present height.

3. A vehicle periphery monitoring system according to claim 1, wherein said indicating unit comprises a display unit for displaying a bird's-eye image converted from the image captured by said imaging unit, and said control unit controls said display unit to display the detected obstacle as a safe obstacle overlappingly in the bird's-eye image displayed by said display unit if the acquired height of the detected obstacle is less than said present height.

4. A vehicle periphery monitoring system according to claim 3, wherein said control unit controls said display unit to display the detected obstacle in combination with distance indicator lines indicative of respective distances from the vehicle and distance indicator markings associated with said distance indicator lines, overlapping in the bird's-eye image if the acquired height of the detected obstacle is less than said preset height.

5. A vehicle periphery monitoring system according to any one of claims 1 through 4, wherein said control unit performs the image process on a portion of the viewpoint-changed image which is produced by changing the viewpoint of the image captured by said image unit, thereby acquiring the height of the detected obstacle.

6. A vehicle periphery monitoring system according to claim 5, wherein said obstacle detecting unit comprises either a sonic sonar or an ultrasonic sonar for radiating sonic waves or ultrasonic waves to detect the presence of an obstacle in the periphery of the vehicle.

7. A vehicle periphery monitoring system comprising:
   an obstacle detecting unit for detecting the presence of an obstacle in a periphery of vehicle, wherein the obstacle detecting unit includes means for measuring a distance from the vehicle to the obstacle;
   an indicating unit for indicating the presence of the obstacle;
   a control unit for controlling said indicating unit to indicate the presence of the obstacle is detected by said obstacle detecting unit; and
   an imaging unit for capturing an image of a periphery of the vehicle;
   wherein said control unit is configured to generate a first viewpoint-changed image by changing a first viewpoint of a first image that is captured by said imaging unit at a moment just after said image unit captured said obstacle, and to generate a second viewpoint-changed image by changing a second viewpoint of a second image that is captured by said imaging unit at a predetermined time after said image unit has captured said obstacle,
   wherein said control unit is configured to perform an image processing process only on a part of said second viewpoint-changed image when a second feature point of said obstacle contained in said second viewpoint-changed image that corresponds to a first feature point in said first viewpoint-changed image is searched, thereby acquiring the height of the detected obstacle,
   wherein said control unit is configured to control said indicating unit to either indicate the detected obstacle as a safe obstacle or inhibit the detected obstacle from being indicated if the acquired height of the detected obstacle is less than a preset height, and
   wherein said control unit is configured to control said indicating unit to indicate the detected obstacle as a dangerous obstacle if the acquired height of the detected obstacle is equal to or greater than said preset height.

8. A system for selectively indicating objects in the periphery of a vehicle, comprising:
   an object detector mounted on the vehicle for detecting the presence of an object in the periphery of the vehicle;

an imaging unit mounted on the vehicle for capturing an image of an area in the periphery of the vehicle;

an object indicator mounted on the vehicle for indicating the presence of an object detected in the periphery of the vehicle by said object detector; and a controller mounted on the vehicle for controlling said object indicator to indicate the presence of an object detected by said obstacle detecting unit if the height of the object, which is acquired from processed image data of first and second viewpoint-changed images generated by changing viewpoints of first and second images that are captured by said image unit at a moment just after said imaging unit captured said obstacle and at a predetermined time after said image unit has captured said obstacle, respectively, is equal to or greater than a preset height, wherein when a second feature point of said obstacle contained in said second viewpoint-changed image that corresponds to a first feature point in said first viewpoint-changed image is searched, said controller performs an image processing process only on a part of said second viewpoint-changed image.

9. A system according to claim 8, wherein said controller controls said object indicator unit to indicate the presence of an object detected by said object detector as a dangerous object if the height of the obstacle is equal to or greater than said preset height, and controls said object indicator to indicate the presence of an object detected by said obstacle detector as a safe object if the height of the object is less than said preset height.

10. A system according to claim 8, wherein said controller controls said object indicator unit to indicate the presence of an object detected by said obstacle detector as a dangerous object if the height if the obstacle is equal to or greater than said preset height, and controls said object indicator to inhibit the presence of an object detected by said obstacle detector from being indicated if the height of the obstacle detector from being indicated if the height of the object is less than said preset height.

11. A system according to claim 8, wherein said object indicator comprises a display unit for displaying the image captured by said imaging unit, and said control unit controls said display unit to display the detected object overlappingly in the captured image displayed by said display unit.

12. A system according to claim 8, wherein said object indicator comprises a display unit for displaying a bird's-eye image converted from the image captured by said imaging unit, and said control unit controls said display unit to display the detected object overlappingly in the bird's-eye image displayed by said display unit.

13. A system according to claim 12, wherein said control unit controls said display unit to display the detected object in combination with distance indicator lines indicative of respective distances from the vehicle and distance indicator marking associated with said distance indicator lines, overlapping in the bird's-eye image.

* * * * *